(12) United States Patent
Earl et al.

(10) Patent No.: US 8,242,038 B2
(45) Date of Patent: Aug. 14, 2012

(54) LOW THERMAL EXPANSION HIGH STRENGTH HONEYCOMB CEMENT AND METHOD THEREFOR

(75) Inventors: David A Earl, Flower Mound, TX (US); Tonia Havewala Fletcher, Big Flats, NY (US); Robert John Paisley, Corning, NY (US); Irene Mona Peterson, Elmira Heights, NY (US)

(73) Assignee: Corning Incorporated, Corning, NY (US)

( * ) Notice: Subject to any disclaimer, the term of this patent is extended or adjusted under 35 U.S.C. 154(b) by 914 days.

(21) Appl. No.: 12/255,885

(22) Filed: Oct. 22, 2008

(65) Prior Publication Data

US 2009/0110875 A1 Apr. 30, 2009

Related U.S. Application Data

(60) Provisional application No. 61/001,268, filed on Oct. 31, 2007, provisional application No. 61/002,805, filed on Nov. 13, 2007.

(51) Int. Cl.
*C04B 33/00* (2006.01)

(52) U.S. Cl. ......... 501/119; 501/128; 501/141; 501/144

(58) Field of Classification Search .................. 501/119, 501/128, 141, 144
See application file for complete search history.

(56) References Cited

U.S. PATENT DOCUMENTS

| | | | |
|---|---|---|---|
| 4,568,402 A | 2/1986 | Ogawa et al. | |
| 4,840,827 A | 6/1989 | Mizutani et al. | |
| 5,188,779 A | 2/1993 | Horikawa et al. | |
| 5,258,205 A | 11/1993 | Wu | 427/393.6 |
| 5,629,067 A | 5/1997 | Kotani et al. | |
| 6,391,813 B1* | 5/2002 | Merkel | 501/119 |
| 6,541,407 B2* | 4/2003 | Beall et al. | 501/119 |
| 6,710,014 B2 | 3/2004 | Domesle et al. | |
| 6,726,977 B2 | 4/2004 | Kumazawa et al. | |
| RE38,888 E * | 11/2005 | Beall et al. | 501/119 |
| 7,520,911 B2* | 4/2009 | Beall et al. | 55/523 |
| 2005/0159308 A1 | 7/2005 | Bliss et al. | |
| 2005/0255288 A1 | 11/2005 | Noguchi et al. | |
| 2007/0119133 A1 | 5/2007 | Beall et al. | |
| 2008/0004171 A1* | 1/2008 | Melscoet-Chauvel et al. | 501/119 |

FOREIGN PATENT DOCUMENTS

| | | |
|---|---|---|
| EP | 0 677 498 A2 | 10/1995 |
| EP | 1 696 109 | 8/2006 |
| WO | 2008/005291 | 1/2008 |

\* cited by examiner

*Primary Examiner* — Karl Group
(74) *Attorney, Agent, or Firm* — Joseph M. Homa; Matthew J. Mason

(57) ABSTRACT

A cement mixture suitable for use with ceramic honeycomb bodies, such as for forming an outer layer on the outer periphery of the honeycomb body, or for forming plugs in the honeycomb body. The cement mixture, when fired, preferably exhibits low coefficient of thermal expansion and high strength. The cement mixture can be applied to a green honeycomb body and simultaneously fired with the green body or can be applied to an already fired ceramic honeycomb body and then fired. Includes cement mixture comprising a plurality of inorganic components comprising talc, kaolin, alumina, silica, and aluminum hydroxide, wherein the mixture contains less than or equal to 18.0% silica and greater than or equal to 17.0% aluminum hydroxide, in percent by weight of the inorganic components.

11 Claims, 1 Drawing Sheet

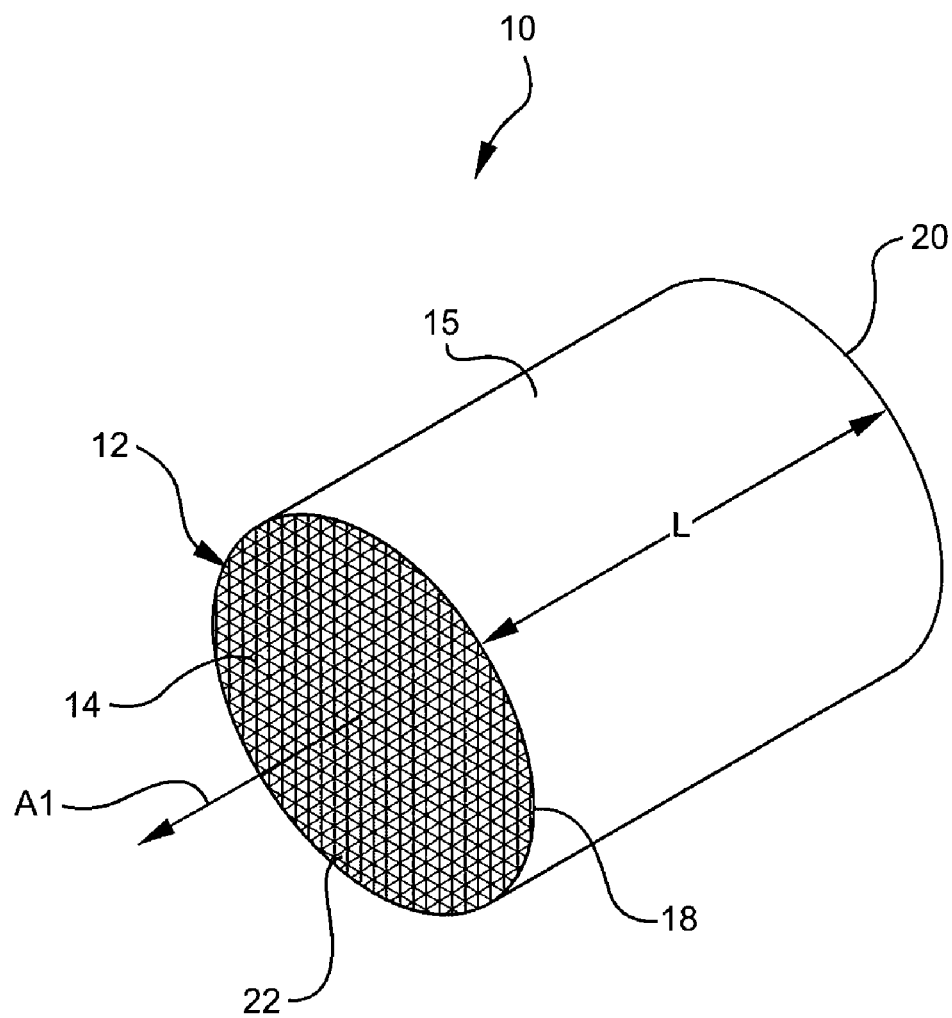

LOW THERMAL EXPANSION HIGH STRENGTH HONEYCOMB CEMENT AND METHOD THEREFOR

RELATED APPLICATIONS

This application claims the benefit of U.S. Provisional Application No. 61/001,268 filed Oct. 31, 2007, entitled "Low Thermal Expansion High Strength Honeycomb Cement and Method Therefor" and U.S. Provisional Application No. 61/002,805 filed Nov. 13, 2007, entitled "Low Thermal Expansion High Strength Honeycomb Cement and Method Therefor."

BACKGROUND

The present invention relates generally to cements suitable for use with ceramic honeycomb bodies, such as for forming an outer layer on the outer periphery of the honeycomb body, or for forming plugs in the honeycomb body.

The exhaust gases emitted by internal combustion systems utilizing hydrocarbon fuels, such as hydrocarbon gases, gasoline or diesel fuel, can cause serious pollution of the atmosphere. Among the many pollutants in these exhaust gases are hydrocarbons and oxygen-containing compounds, the latter including nitrogen oxides (NOx) and carbon monoxide (CO). The automotive industry has for many years attempted to reduce the quantities of gaseous emissions from automobile engine systems. Honeycomb structures have been implemented. An outer layer or "artificial skin" or "after-applied skin" can be applied to the outer periphery of honeycomb bodies after the honeycomb bodies have been extruded. Such skin or layer is not co-extruded with the honeycomb body, but is applied after the honeycomb body has been extruded.

Defects such as cracking, separation, and delamination of the skin have been observed after catalyzation of honeycomb structures having a skin formed from known dryer-cured coatings which require only low temperatures to dry or cure, but which can begin to soften and weaken when exposed above 900° C. subsequent to drying or curing.

Known coatings have cordierite powder as a main batch component, which is produced by milling substrates or filters or matrixes designated as scrap or reject material in manufacturing. As the filter scrap level continues to decrease, owing to increased demand for cordierite reuse (powder) in manufacturing, and the demand for substrates and filters increases, a shortage of cordierite powder, and, therefore, an increased cost of goods, is eventually expected to occur.

SUMMARY

Disclosed herein is a cement mixture, or sealing mixture, suitable for use with ceramic honeycomb bodies, such as for forming an outer layer on the outer periphery of the honeycomb body, or for forming plugs in the honeycomb body. The cement mixture, when fired, preferably exhibits low coefficient of thermal expansion and high strength. The cement mixture can be applied to a green honeycomb body (and simultaneously fired with the green body) or can be applied to an already fired (ceramic) honeycomb body and then fired. Preferably, the cement mixture comprises a plurality of inorganic components comprising talc, kaolin, alumina, silica, and aluminum hydroxide, wherein the mixture contains less than or equal to 18.0% silica and greater than or equal to 17.0% aluminum hydroxide, in percent by weight of the inorganic components.

The cement mixture disclosed herein is preferably heated to more than 1000° C., more preferably greater than 1200° C., even more preferably greater than 1300° C., and in some embodiments greater than 1380° C., and in other embodiments greater than or equal to 1400° C.

Additional features and advantages of the present invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of the specification. The drawings illustrate various embodiments and aspects of the invention, and together with the description serve to explain the principles and operations of the invention.

BRIEF DESCRIPTION OF THE DRAWINGS

The FIGURE shows a honeycomb body to which the cement mixture disclosed herein can be applied.

DETAILED DESCRIPTION

Reference will now be made in detail to the present preferred embodiments of the invention, examples and aspects of which are illustrated in the accompanying drawings.

As used herein, the term "ceramic precursor components" includes inorganic batch materials (e.g., MgO, $Al_2O_3$, $SiO_2$ and the like) at least some of which form a desired ceramic phase, such as cordierite, upon firing, as well as binders, solvents, lubricants, and the like.

The FIGURE illustrates a honeycomb structure 10 that comprises a honeycomb body 12 having a longitudinal axis A1 that defines the axial direction, and an axial length L. Honeycomb body 12 is comprised of a matrix of intersecting, thin, porous walls 14 surrounded by an outer wall 15, which in the illustrated example is provided a circular cross-sectional configuration. Honeycomb body 12 can thus be referred to also as the "matrix." The walls 14 extend across and between a first end face 18 and an opposing second end face 20, and form a large number of adjoining hollow passages or cell channels 22 that also extend between, and are open at, the end faces 18, 20 of the ware 10. Each cell channel 22 thus has a first channel end at end face 18 and a second channel end at end face 20.

One aspect of the present invention is directed to a honeycomb article, which article includes a green honeycomb matrix of intersecting walls that define a plurality of cells, wherein the matrix includes a first plurality of ceramic precursor components; and an after-applied skin disposed on an outer surface of the matrix, wherein the after-applied skin is comprised of a second plurality of ceramic precursor components. The green honeycomb matrix is an extruded structure, whereas the after-applied skin is not co-extruded with the matrix.

Another aspect of the present invention is directed to a method of manufacturing a ceramic honeycomb article, the method including the steps of providing a green ceramic-forming matrix of intersecting ceramic walls defining a plurality of cells; applying an after-applied ceramic-forming skin to an outer surface of the matrix; and simultaneously firing the matrix and the skin to form the ceramic honeycomb article. The green ceramic-forming matrix is an extruded structure, whereas the after-applied ceramic-forming skin is not co-extruded with the matrix.

In one aspect, a cement mixture for a honeycomb body is disclosed herein, the cement mixture comprising: a plurality of inorganic components comprising talc, kaolin, alumina, silica, and aluminum hydroxide, wherein the mixture contains less than or equal to 18.0% silica and greater than or equal to 17.0% aluminum hydroxide, in percent by weight of the inorganic components. Preferably, the cement mixture, upon being fired, forms a ceramic material having a modulus of rupture of greater than 700 psi, more preferably greater than 900 psi, even more preferably greater than 1000 psi, still more preferably greater than 1200 psi, and in some embodiments greater than 1500 psi, as measured on a solid rod of circular cross section of the ceramic material. Preferably, the cement mixture, upon being fired, forms a ceramic material having a coefficient of thermal expansion at 800° C. on cooling of less than $15 \times 10^{-7}/°$ C., more preferably less than $14 \times 10^{-7}/°$ C., even more preferably less than $13 \times 10^{-7}/°$ C., still more preferably less than $10 \times 10^{-7}/°$ C., even more preferably less than $9 \times 10^{-7}/°$ C., and in some embodiments less than $8 \times 10^{-7}/°$ C. In some embodiments, the mixture contains between 10.0 and 18.0 wt % silica, in percent by weight of the inorganic components; in other embodiments, the mixture contains between 1 1.0 and 17.0 wt % silica, in percent by weight of the inorganic components. In some embodiments, the mixture contains between 17.0 and 25.0 wt % aluminum hydroxide, in percent by weight of the inorganic components; in other embodiments, the mixture contains between 18.0 and 21.0 wt % aluminum hydroxide, in percent by weight of the inorganic components. In some embodiments, the mixture contains between 10.0 and 15.0 wt % kaolin, in percent by weight of the inorganic components; in other embodiments the mixture contains between 10.0 and 14.0 wt % kaolin, in percent by weight of the inorganic components. In some embodiments, the mixture contains between 20.0 and 45.0 wt % talc, in percent by weight of the inorganic components; in other embodiments, the mixture contains between 30.0 and 45.0 wt % talc, in percent by weight of the inorganic components. In some embodiments, the mixture contains between 10.0 and 25.0 wt % alumina, in percent by weight of the inorganic components. In other embodiments, the mixture contains between 15.0 and 20.0 wt % alumina, in percent by weight of the inorganic components. In some embodiments, the mixture further comprises an organic binder; in some embodiments, the mixture contains less than 5 wt % organic binder in percent superaddition to the inorganic components; in other embodiments, the mixture contains less than 2 wt % organic binder in percent superaddition to the inorganic components. Preferably, the mixture further comprises a liquid vehicle, and even more preferably the mixture is applied as a paste. In some embodiments, the mixture is free of fired ceramic particles.

In another aspect, a cement mixture for a honeycomb body is disclosed herein, the cement mixture comprising a plurality of inorganic components comprising talc, kaolin, alumina, silica, and aluminum hydroxide, wherein the mixture contains less than or equal to 18.0% silica, greater than or equal to 17.0% aluminum hydroxide, between 10.0 and 15.0 wt % kaolin, between 20.0 and 45.0 wt % talc, and between 10.0 and 25.0 wt % alumina, in percent by weight of the inorganic components. Preferably, the cement mixture, upon being fired, forms a ceramic material having a modulus of rupture of greater than 700 psi, more preferably greater than 900 psi, even more preferably greater than 1000 psi, still more preferably greater than 1200 psi, and in some embodiments greater than 1500 psi, as measured on a solid rod of circular cross section of the ceramic material. Preferably, the cement mixture, upon being fired, forms a ceramic material having a coefficient of thermal expansion at 800° C. on cooling of less than $15 \times 10^{-7}/°$ C., more preferably less than 14, even more preferably less than 13, still more preferably less than 10, even more preferably less than 9, and in some embodiments less than $8 \times 10^{-7}/°$ C. In some embodiments, the mixture contains between 10.0 and 18.0 wt % silica, in percent by weight of the inorganic components; in other embodiments, the mixture contains between 1 1.0 and 17.0 wt % silica, in percent by weight of the inorganic components. In some embodiments, the mixture contains between 17.0 and 25.0 wt % aluminum hydroxide, in percent by weight of the inorganic components; in other embodiments, the mixture contains between 18.0 and 21.0 wt % aluminum hydroxide, in percent by weight of the inorganic components. In some embodiments, the mixture contains between 10.0 and 14.0 wt % kaolin, in percent by weight of the inorganic components. In some embodiments, the mixture contains between 30.0 and 45.0 wt % talc, in percent by weight of the inorganic components. In some embodiments, the mixture contains between 15.0 and 20.0 wt % alumina, in percent by weight of the inorganic components. In some embodiments, the mixture further comprises an organic binder; in some embodiments, the mixture contains less than 5 wt % organic binder in percent superaddition to the inorganic components; in other embodiments, the mixture contains less than 2 wt % organic binder in percent superaddition to the inorganic components. Preferably, the mixture further comprises a liquid vehicle, and even more preferably the mixture is applied as a paste. In some embodiments, the mixture is free of fired ceramic particles.

In another aspect, a method of manufacturing a honeycomb structure is disclosed herein, the method comprising: applying a cement mixture to an outer surface of a honeycomb body to form an outer layer of the cement mixture on the honeycomb body, the cement mixture comprising a plurality of inorganic components comprising talc, kaolin, alumina, silica, and aluminum hydroxide, wherein the mixture contains less than or equal to 18.0% silica and greater than or equal to 17.0% aluminum hydroxide, in percent by weight of the inorganic components; then, exposing the honeycomb body with the outer layer to a first firing environment for a time and at one or more temperatures sufficient to cause a first ceramic material to form in the outer layer. In some embodiments, the honeycomb body is comprised of ceramic-forming components; in some of these embodiments, a second ceramic material is formed in the honeycomb body during the exposing step. In some embodiments, the honeycomb body is comprised of a ceramic material. Preferably, the cement mixture, upon being fired, forms a ceramic material having a modulus of rupture of greater than 700 psi, more preferably greater than 900 psi, even more preferably greater than 1000 psi, still more preferably greater than 1200 psi, and in some embodiments greater than 1500 psi, as measured on a solid rod of circular cross section of the ceramic material. Preferably, the cement mixture, upon being fired, forms a ceramic material having a coefficient of thermal expansion at 800° C. on cooling of less than $15 \times 10^{-7}/°$ C., more preferably less than 14, even more preferably less than 13, still more preferably less than 10, even more preferably less than 9, and in some embodiments less than $8 \times 10^{-7}/°$ C. In some embodiments, the mixture is free of fired ceramic particles. The cement mixture is preferably heated to more than 1000° C., more preferably greater than 1200° C., even more preferably greater than 1300° C., and in some embodiments greater than 1380° C., and in other embodiments greater than or equal to 1400° C.

In yet another aspect, a method of manufacturing a honeycomb structure is disclosed herein, the method comprising: providing a honeycomb body comprised of intersecting walls defining a plurality of cells; inserting a cement mixture into at least one cell, the cement mixture comprising a plurality of inorganic components comprising talc, kaolin, alumina, silica, and aluminum hydroxide, wherein the mixture contains less than or equal to 18.0% silica and greater than or equal to 17.0% aluminum hydroxide, in percent by weight of the inorganic components; then exposing the honeycomb body and the inserted cement mixture to a first firing environment for a time and at one or more temperatures sufficient to cause a first ceramic material to form from the cement mixture and seal the at least one cell, thereby plugging the at least one cell. The cement mixture is preferably heated to more than 1000° C., more preferably greater than 1200° C., even more preferably greater than 1300° C., and in some embodiments greater than 1380° C., and in other embodiments greater than or equal to 1400° C. In some embodiments, the honeycomb body is comprised of ceramic-forming components; in some of these embodiments, a second ceramic material is formed in the honeycomb body during the exposing step. In some embodiments, the honeycomb body is comprised of a ceramic material. Preferably, the cement mixture, upon being fired, forms a ceramic material having a modulus of rupture of greater than 700 psi, more preferably greater than 900 psi, even more preferably greater than 1000 psi, still more preferably greater than 1200 psi, and in some embodiments greater than 1500 psi, as measured on a solid rod of circular cross section of the ceramic material. Preferably, the cement mixture, upon being fired, forms a ceramic material having a coefficient of thermal expansion at 800° C. on cooling of less than $15 \times 10^{-7}/°$ C., more preferably less than 14, even more preferably less than 13, still more preferably less than 10, even more preferably less than 9, and in some embodiments less than $8 \times 10^{-7}/°$ C. In some embodiments, the mixture is free of fired ceramic particles.

In still another aspect, a honeycomb structure is disclosed herein comprising a ceramic honeycomb matrix having an outer layer, wherein the outer layer has a modulus of rupture of greater than 700 psi, as measured on a solid rod of circular cross section of the ceramic material, and a coefficient of thermal expansion at 800° C. on cooling of less than $15 \times 10^{-7}/°$ C.

In another aspect, a honeycomb structure is disclosed herein comprising a ceramic honeycomb matrix having a plurality of walls defining a plurality of cells, and plugs disposed in at least some of the cells, wherein the plugs have a modulus of rupture of greater than 700 psi, as measured on a solid rod of circular cross section of the ceramic material, and a coefficient of thermal expansion at 800° C. on cooling of less than $15 \times 10^{-7}/°$ C.

EXAMPLES

The invention will be further clarified by the following examples.

Talc, clay, silica, alumina, aluminum hydroxide, and, optionally, cordierite powder were combined with methylcellulose binder (1 wt %) and water (45 wt %) to produce a paste. The paste was applied to an unfired (green) diesel filter honeycomb matrix and co-fired with the matrix to approximately 1400° C., with temperature-holds generally between 200 and 300° C. and at about 1000° C. Table 3 lists exemplary formulations for six cement mixtures. Table 4 lists the fired crystalline phases, percent firing shrinkage, flexural strength values (as modulus of rupture, in psi), coefficient of thermal expansion values (at 800° C. on cooling, values in units of x $10^{-7}/°$ C.), and thermal shock parameters, for each corresponding fired ceramic formed from the cement mixtures.

Table 4 indicates that increases in the strength of fired ceramic coatings can be achieved by adjusting the proportions of mineral raw materials in the batch. Because the cements, or sealants, were fired to approximately 1400° C., and dilatometer tests up to 1000° C revealed no slumping or viscous flow, the cements properties were stable to at least 1000° C. As illustrated by the Examples in Table 2, the primary or major phase of the ceramic formed after firing of the cement was cordierite, and minor phases included spinel, mullite, and/or sapphirine.

We have found, for example, that the strength (in psi) required to peel off, or pull off, an outer (skin) layer formed from the cement mixture of Example 1 was over about twice as high, and in some cases around ten times higher than the peel off strength of known coatings, which includes dryer-cured and calcined coatings.

|  | 1 | 2 | 3 | 4 | 5 | 6 |
|---|---|---|---|---|---|---|
| Batch Materials (weight %)[1]: | | | | | | |
| Talc | 40.6 | 35.9 | 34.0 | 39.0 | 39.2 | 20.3 |
| Clay | 11.7 | 11.7 | 11.7 | 11.7 | 11.7 | 5.8 |
| Silica | 14.4 | 16.4 | 16.0 | 13.8 | 11.4 | 7.2 |
| Alumina | 14.7 | 16.1 | 19.8 | 15.6 | 16.8 | 7.4 |
| Aluminum hydroxide | 18.6 | 19.9 | 18.5 | 19.9 | 20.9 | 9.3 |
| Cordierite Powder | 0 | 0 | 0 | 0 | 0 | 50.0 |
| Total: | 100 | 100 | 100 | 100 | 100 | 100 |
| Crystalline Phases in Fired Coating | | | | | | |
| Major Phase | Cordierite | Cordierite | Cordierite | Cordierite | Cordierite | Cordierite |
| Minor Phases | Spinel, Sapphirine | Mullite, Spinel | Mullite, Spinel | Sapphirine, Mullite, Spinel | Sapphirine, Mullite, Spinel | Sapphirine, Spinel |

-continued

|  | 1 | 2 | 3 | 4 | 5 | 6 |
|---|---|---|---|---|---|---|
| Bulk Properties |  |  |  |  |  |  |
| % Firing Shrinkage | −3.4 | −2.4 | −1.3 | −2.0 | −1.4 | 0.0 |
| Modulus of Rupture (psi): | 961 | 1033 | 736 | 1636 | 949 | 921 |
| Coefficient of Thermal Expansion @ 800 C. on Cooling ($\times 10^{-7}$/C.) | 7.2 | 9.2 | 12.2 | 8.4 | 12.5 | 14.3 |
| Thermal Shock Parameter | 0.8 | 0.75 | 1.25 | 0.4 | 1.05 | 0.9 |

[1]Binder (1 wt % superaddition) and water (45 wt % superaddition) were included in each formulation Thus, the cement mixture and methods disclosed herein can help eliminate a separate curing step (e.g. skin, or plugs, that require application onto a ceramic honeycomb and therefore need a separate curing step for the skin or plugs), can help reduce the requirement for ceramic powder, such as cordierite powder, added to the skin or plug material, and, accordingly, can help lower raw materials costs as compared to known dryer-cured and re-fired coatings. The cement mixture disclosed herein, when applied to a honeycomb body, can help provide increased mechanical (flexural) strength, greater cohesion and adhesion, improved consistency of properties during catalyzation and end use, and improved reliability at high temperature.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

The invention claimed is:

1. A cement mixture for application to a honeycomb body, the cement mixture comprising:
a plurality of inorganic components comprising talc, kaolin, alumina, silica, fired ceramic particles, and aluminum hydroxide, wherein the mixture contains less than or equal to 18.0% silica and greater than or equal to 17.0% aluminum hydroxide, in percent by weight of the inorganic components.

2. The cement mixture of claim 1 wherein the cement mixture, upon being fired, forms a ceramic material having a modulus of rupture of greater than 700 psi, as measured on a solid rod of circular cross section of the ceramic material.

3. The cement mixture of claim 1 wherein the cement mixture, upon being fired, forms a ceramic material having a coefficient of thermal expansion at 800° C. on cooling of less than $15 \times 10^{-7}$/° C.

4. A cement mixture for application to a honeycomb body, the cement mixture comprising:
a plurality of inorganic components comprising talc, kaolin, alumina, silica, fired ceramic particles, and aluminum hydroxide, wherein the mixture contains less than or equal to 18.0% silica, greater than or equal to 17.0% aluminum hydroxide, between 10.0 and 15.0 wt % kaolin, between 20.0 and 45.0 wt % talc, and between 10.0 and 25.0 wt % alumina, in percent by weight of the inorganic components.

5. The cement mixture of claim 1 wherein the cement mixture, upon being fired, forms a ceramic material having a modulus of rupture of greater than 700 psi, as measured on a solid rod of circular cross section of the ceramic material, and a coefficient of thermal expansion at 800° C. on cooling of less than $15 \times 10^{-7}$/° C.

6. The cement mixture of claim 1, wherein the fired ceramic particles comprise cordierite powder.

7. The cement mixture of claim 1, wherein the mixture contains between 15.0 and 20.0 wt % alumina.

8. The cement mixture of claim 1, wherein the mixture contains less than 2 wt % organic binder in percent superaddition to the inorganic components.

9. The cement mixture of claim 4, wherein the fired ceramic particles comprise cordierite powder.

10. The cement mixture of claim 4, wherein the mixture contains between 15.0 and 20.0 wt % alumina.

11. The cement mixture of claim 4, wherein the mixture contains less than 2 wt % organic binder in percent superaddition to the inorganic components.

* * * * *